E. PARKER.
Manufacture of Eyelets.
No. 6,426. Reissued May 11, 1875.
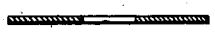
Fig. 1.
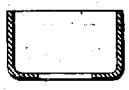
Fig. 2.
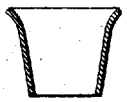
Fig. 3
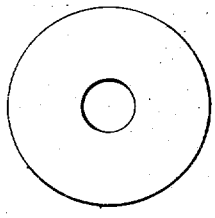
Fig. 7.
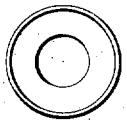
Fig. 8
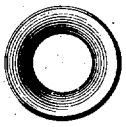
Fig. 9.
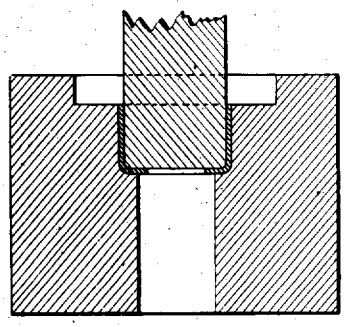
Fig. 4.
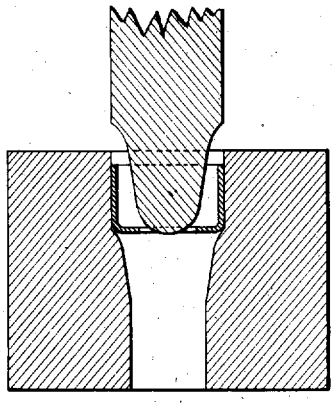
Fig. 5.
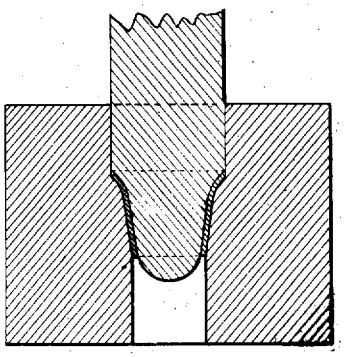
Fig. 6.
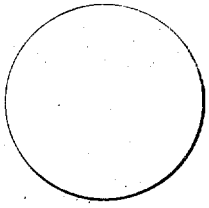
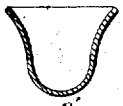
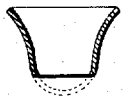
Witnesses
Chas. H. Smith
Geo. D. Walker.
Inventor
Edward Parker.
per Lemuel W. Serrell
Atty

UNITED STATES PATENT OFFICE.

EDWARD PARKER, OF PLYMOUTH, ASSIGNOR, BY MESNE ASSIGNMENTS, TO THE AMERICAN RING COMPANY, OF WATERBURY, CONN.

IMPROVEMENT IN THE MANUFACTURE OF EYELETS.

Specification forming part of Letters Patent No. 43,954, dated August 23, 1864; reissue No. 6,426, dated May 11, 1875; application filed February 27, 1875.

*To all whom it may concern:*

Be it known that I, EDWARD PARKER, of Plymouth, in the county of Litchfield and State of Connecticut, have invented an Improvement in the Manufacture of Eyelets, of which the following is a specification:

In the manufacture of eyelets it has heretofore been usual to employ a disk of metal and stamp it up into a cup shape by dies, and then remove the metal at the smaller and closed end. This mode of manufacture is illustrated by Figures 4, 5, and 6 of the drawing, in which the disk of metal is represented in Fig. 4, and the cup in Fig. 5, which is completed by two or more stamping operations. After this, and as a finishing operation, the closed convex part *g* is removed by filing or piercing, so as to open the hole through the eyelet, as illustrated by Fig. 6.

By the foregoing process the metal that is removed becomes a loss, while by my improvement a portion of it helps to elongate the eyelet, so that a smaller blank can be used for the same-sized eyelet.

My invention relates to the mode of manufacturing eyelets by punching a hole in the sheet metal of less diameter than the opening through the eyelet, and finishing the eyelet by stamping the same up in such a manner that the metal is extended to lengthen the eyelet in the act of enlarging the hole in finishing the eyelet.

By this mode of manufacture the eyelet is entirely finished by the machine, and the inner and outer surfaces of the metal at the end of the eyelet are pressed by the punch and die, so as to be free from burrs and projections, and a saving of metal is effected.

Fig. 1 of the drawing represents, by plan and section, the metal blank or disk. Fig. 2 represents the same as stamped up into a cup, and Fig. 3 is a section of the eyelet.

The dies employed are adapted to perform the successive operations.

The blank, Fig. 1, is cut out by dies, and, by a punch and die shaped as illustrated in Fig. 7, the blank is drawn to the cup shape shown in Fig. 2, and this stage may be reached by two or more successive drawing operations, so that the eyelet of the cup shape, with the central hole, is in a condition for the last operation, wherein dies such as shown in Figs. 8 and 9 are employed, that serve to spread the bottom of the cup downwardly and crowd the eyelet down into the die, as in Fig. 9. This operation elongates the eyelet, and a portion of the metal that would be cut away in the former mode of making eyelets is saved, and increases the length of said eyelet.

I am aware that eyelets have been shaped by machinery, as in the patent of L. E. Hicks, December 19, 1850; but the disks were not perforated previous to the last stamping operation.

I claim as my invention—

The method herein described of manufacturing eyelets by perforating the metallic blank with a hole that is smaller than the opening through the eyelet, and then stamping up the eyelet, substantially as specified.

Signed by me this 5th day of February, 1875.

EDWARD PARKER.

Witnesses:

D. S. PLUME,

J. S. EASTWOOD.